(12) United States Patent
Gonus et al.

(10) Patent No.: US 9,700,062 B2
(45) Date of Patent: Jul. 11, 2017

(54) METHOD FOR PREPARATION OF A CREAMY MILK BASED BEVERAGE FROM A CAPSULE AND KIT FOR SUCH PREPARATION

(75) Inventors: Philippe Gonus, Yverdon-les-bains (CH); Marcel Rosse, Saint-aubin-sauges (CH); Zenon Ioannis Mandralis, Chexbres (CH)

(73) Assignee: Nestec S.A., Vevey (CH)

( * ) Notice: Subject to any disclaimer, the term of this patent is extended or adjusted under 35 U.S.C. 154(b) by 1319 days.

(21) Appl. No.: 12/597,420

(22) PCT Filed: Apr. 23, 2008

(86) PCT No.: PCT/EP2008/054895
§ 371 (c)(1),
(2), (4) Date: Oct. 23, 2009

(87) PCT Pub. No.: WO2008/129053
PCT Pub. Date: Oct. 30, 2008

(65) Prior Publication Data
US 2010/0136183 A1 Jun. 3, 2010

(30) Foreign Application Priority Data
Apr. 24, 2007 (EP) .................................. 07106875

(51) Int. Cl.
*B65D 85/804* (2006.01)
*A23C 9/16* (2006.01)
*A47J 31/00* (2006.01)
*A23F 5/24* (2006.01)
*A23L 2/38* (2006.01)

(52) U.S. Cl.
CPC ............... *A23C 9/16* (2013.01); *A47J 31/002* (2013.01); *B65D 85/8043* (2013.01); *A23F 5/24* (2013.01); *A23F 5/243* (2013.01); *A23L 2/38* (2013.01)

(58) Field of Classification Search
CPC .................................................. B65D 85/8043
USPC .......................................................... 99/295
See application file for complete search history.

(56) References Cited

U.S. PATENT DOCUMENTS

| | | | | |
|---|---|---|---|---|
| 2,282,138 | A | * | 5/1942 | Kellogg ........................... 426/45 |
| 3,353,474 | A | * | 11/1967 | MacCorkell .................... 99/281 |
| 5,895,672 | A | * | 4/1999 | Cooper ............................ 426/79 |
| 6,180,159 | B1 | | 1/2001 | Villagran et al. |
| 6,758,130 | B2 | * | 7/2004 | Sargent et al. .................. 99/295 |
| 6,805,041 | B2 | | 10/2004 | Colston et al. |
| 7,537,138 | B2 | | 5/2009 | Saggin et al. |
| 7,987,767 | B2 | | 8/2011 | Hester et al. |
| 2002/0031588 | A1 | * | 3/2002 | Eugster .......................... 426/523 |
| 2003/0005826 | A1 | | 1/2003 | Sargent et al. |
| 2004/0062846 | A1 | * | 4/2004 | Sargent et al. .............. 426/601 |
| 2005/0048186 | A1 | * | 3/2005 | Lehmberg et al. ........... 426/594 |
| 2005/0053582 | A1 | * | 3/2005 | Kringelum et al. .......... 424/93.2 |
| 2006/0110516 | A1 | | 5/2006 | Holtus et al. |
| 2006/0128591 | A1 | * | 6/2006 | Albrecht et al. .............. 510/438 |
| 2007/0009636 | A1 | | 1/2007 | Sher et al. |
| 2010/0323068 | A1 | | 12/2010 | Gonus et al. |

FOREIGN PATENT DOCUMENTS

| | | |
|---|---|---|
| EP | 02 72922 | 6/1988 |
| EP | 0 756 844 | 2/1997 |
| EP | 1 472 156 | 11/2004 |
| EP | 1 609 398 | 12/2005 |
| JP | 62104554 | 5/1987 |
| JP | 2004508077 | 3/2004 |
| JP | 2004535854 | 12/2004 |
| WO | 02 19875 | 3/2002 |
| WO | 0219699 | 3/2002 |
| WO | 0219875 | 3/2002 |
| WO | 02 087400 | 11/2002 |
| WO | 02087400 | 11/2002 |
| WO | 03 059778 | 7/2003 |
| WO | 2006002741 | 1/2006 |
| WO | WO 2006022540 A1 * | 3/2006 |

OTHER PUBLICATIONS

Baileys Industrial Oil and Fat Products, Sixth Edition, Six Volume Set; Edited by Fereidoon Shahidi. Copyright 2005; vol. 1, p. 221; vol. 2, p. 138.*
International Search Report mailed Aug. 25, 2008 (3 pgs.).
Written Opinion of the International Searching Authority mailed Aug. 25, 2008 (5 pgs.).

* cited by examiner

Primary Examiner — W Moore
(74) Attorney, Agent, or Firm — K&L Gates LLP

(57) ABSTRACT

Method for the preparation of a foamy or creamy instant drink, wherein at least two capsules are sequentially injected with cold water to produce an instant milk-based drink, the first capsule to be injected comprising milk powder, a creamer component and sugar, the second capsule comprising milk powder, a soluble main flavour component and sugar.

10 Claims, No Drawings

METHOD FOR PREPARATION OF A CREAMY MILK BASED BEVERAGE FROM A CAPSULE AND KIT FOR SUCH PREPARATION

FIELD OF THE INVENTION

The present invention relates to a method for preparing creamy based beverages obtained by dilution from a capsule in a beverage system. It further relates to capsules for such method.

BACKGROUND OF THE INVENTION

Many methods for preparation of a foamed hot drink from cartridges in a beverage dispenser are known.

In EP0272922, a package is used in a beverage dispenser to provide drinks. The package may contain any desired beverage ingredients, for example, roast and ground coffee, leaf tea, chocolate powder and, according to individual taste, powdered milk or creamer, sugar and/or an artificial sweetener. Alternatively, the package may contain liquid beverage ingredients for one preparation of hot or cold beverages, for example a syrup concentrate from the preparation of a carbonated cold beverage therefrom.

WO 02/087400 comprises providing a capsule with a foamable ingredient adapted for a beverage production machine. A fluid is injected into the receptacle in a jet from a nozzle having a small diameter. This method requires, after dilution by injection of water in the capsule, a further step of injection of water in a jet into the receptacle to foam the beverage.

However, it does not exist a method for providing a truly cold coffee and/or cocoa-based beverage with an enhanced creamy head of foam.

OBJECT OF THE INVENTION

It is thus the object of the present invention to provide a method which enables to produce a cold milk based drink with an improved creamy head of foam that resolves the disadvantages of the prior art.

SUMMARY OF THE INVENTION

The present invention relates in a first aspect to a method for the preparation of a foamy or creamy instant drink, comprising the steps of:
a. Injecting a volume of cold water in at least one capsule comprising a composition designed to provide foaming under cold water injection and
b. Delivering the instant drink being the result of the interaction of cold water with the content of the capsule wherein the interaction results both in dissolving under pressure the contents of the capsule in the cold water without mechanical stirring and in frothing of the resulting drink.

One principle of the invention is that a cold foamy drink is obtained by interaction in at least one capsule between cold water injected under pressure and milk-based ingredients containing milk powder without any mechanical stirring and any additional jetting of water in the receptacle.

According to another aspect, at least two capsules are sequentially injected in an extraction device with cold water to produce an instant milk-based drink, wherein the first capsule to be injected comprises milk powder, a creamer component, and sugar, and wherein a second capsule to be injected comprises milk powder, a main flavour soluble component, and sugar.

A second principle of the invention as defined is that milk powder is distributed in two separate capsules; one of which comprising a creamer, another capsule comprising a main flavour soluble component. The benefit is essentially to provide a sufficient dairy and creamy taste to the drink while ensuring full solubility of the drink.

One aspect the invention is that the contents of the first and second capsules have been designed to optimize the miscibility in cold water while ensuring a creamy and dairy body of the drink.

In particular, the ratio of milk powder between the first and second capsules is comprised between 1:10 to 1:2.

Preferably, the ratio of milk powder-to-dairy creamer in the first capsule is comprised between 1:6 and 1:3.

Preferably, the ratio of milk powder-to-sugar in the second capsule is comprised between 1:2 and 2:1, preferably of about 1:1.1.

In particular, the first capsule comprises preferably:
between 10 and 25% sugar,
between 5 and 15% milk powder,
between 10 and 60% creamer.
Also, the second capsule comprises preferably:
between 10 and 40% sugar,
between 20 and 50% milk powder,
between 5 to 20% main flavour component.

Results have shown that a head of dairy (white) foam of between 0.5 to 2 cm can be successively delivered out of the capsule.

Each capsule comprises a closed chamber containing said powder and a means allowing said capsule to be opened at the time of its use and for allowing said instant drink to flow out.

The capsules can be designed, even if non-exclusively, according to the description of patent application EP 1 472 156 B1; the content of which is included herein The invention also relates to a kit for the preparation of a cold, foamy instant milk-based drink comprising at least two capsules,
wherein a first capsule comprises milk powder, a creamer component and sugar,
wherein a second capsule comprises milk powder, a main flavour component and sugar.

The kit of the invention is further defined according to claims 11 to 21.

In a further aspect, the invention also pertains to the use of a food-grade oil to improve the cold water solubility of milk-based powders comprising particulate sugar.

DETAILED DESCRIPTION OF THE INVENTION

The present invention relates to milk-based instant drink powder comprising at least milk powder and particulate sugar.

The term "cold water" refers to water at ambient (about 20 degrees C.) or chilled temperature.

The term "capsule" refers generally to a package containing the ingredients including rigid or partly flexible capsules, cartridges, pods for insertion in a beverage device usually compatible to receive the capsule.

The percentages of ingredients are expressed in weight.

A capsule comprising a milk-based instant drink powder described above also forms part of the invention.

Typically, the capsule has the capacity to hold 10-50 g of the drink powder, preferably between 10-30 g. Preferably the capsule is sealed. Preferably, the capsule is designed to be extracted by injection of fluid under pressure in an extraction device. The capsule is generally designed to produce a delayed opening for the delivery of the drink after at a certain threshold pressure has been reached inside the capsule.

It may comprise a closed chamber containing said powder and a means allowing said capsule to be opened at the time of its use and for allowing said instant drink to flow out. In particular, the means for allowing the capsule to be opened comprises a membrane that seals the ingredient chamber and piercing or breaking elements which act on the membrane to obtain piercing or breaking of the membrane after a certain pressure has been reached inside the ingredient chamber.

Such capsules are known in the art. Suitable capsules which can be used in the present invention are for example described in EP 1 472 156 B1. Preferably, the capsules are impervious to light and moisture. The capsule can be made of plastic and/or metal layers.

In a first embodiment, the method contemplates the use of only one capsule that contains all the ingredients. The capsule may in such case provides a reduced amount of milk powder to provide a dairy based drink without solubility issue during preparation being affected.

Preferably, a single capsule for delivery of the dairy based drink comprises:
 between 5 and 15% of main flavour component (e.g., soluble coffee),
 between 0.2 and 30% of sugar or intense sweetener,
 between 45 and 60% of milk powder,
 between 0 and 3% of foam booster.

The use of sweetener can be preferred to increase the amount of milk solids in the capsule in replacement to sugar.

The use of foam booster can also be preferred, in particular, to compensate for the lack of milk solids in a single capsule and so improve foaming of the drink. Preferably, the booster is present in a proportion of about 0.01 and 0.5%.

The foam booster is defined as an amorphous or powder ingredient containing entrapped gas. The foam booster preferably comprises skimmed milk, maltodextrin and lactose and caseinate.

In a second embodiment, the method contemplates the use of at least two capsules which are sequentially injected in an extraction device with cold water to produce an instant milk-based drink, wherein the first capsule to be injected comprises milk powder, a creamer component, and sugar, and wherein a second capsule to be injected comprises milk powder, a main flavour component, and sugar.

A first capsule thus comprises a dairy or non-dairy creamer, preferably a dairy creamer. Typical dairy creamers comprise skimmed milk, maltodextrins, vegetal oil and buffer salts. Such creamers are commercially available. The creamer enables to obtain a creamy taste.

The creamer provides a positive effect on the overall solubility of the content of the first capsule. It also contributes to providing sufficient foam and body to the drink. In particular, the drink is given a more lactic and creamy taste.

Both capsules comprise a part of the milk powder and a part of the sugar. In this was, the sugar provides an effect on the milk powder in both capsules. The sugar is typically a crystalline sugar. Furthermore, the creamer component is kept separate from the main flavour component.

The second capsule, on the other hand, contains the main flavour component which can be selected from soluble coffee, soluble tea, soluble fruit drink, soluble chocolate powder etc. or any mixtures thereof.

In particular, it has been found that the flavour component has a positive effect on the miscibility of the milk powder in cold water, in particular, soluble coffee.

The second capsule may further comprise additional flavours, aroma etc. such as vanilla flavour, milk cream flavour, citric acid etc.

Preferably, In particular, the first capsule comprises:
 between 10 and 25% sugar,
 between 5 and 15% milk powder,
 between 10 and 60% creamer and,
 the second capsule comprises:
 between 10 and 40% sugar,
 between 20 and 50% milk powder,
 between 5 to 20% main flavour component.

It is advantageous, according to the present invention, to provide a kit for the preparation of a milk-based instant drink comprising at least two capsules wherein a first capsule comprises milk powder, a creamer component and sugar, and wherein a second capsule comprises milk powder, a main flavour component, and sugar.

In a preferred embodiment, at least part of the sugar particles of the first and/or second capsule are coated with a food-grade oil. The food-grade oil preferably comprises saturated triglycerides. Most preferably, the triglycerides comprise C4-C12, preferably C8-C10 saturated fatty acid chains.

The oil preferably comprises saturated triglycerides, wherein the triglycerides more preferably comprise C4-C12, preferably C8-C10 saturated fatty acid chains. Under C4-C12 is to be understood a fatty acid chain comprising 4 to 12 carbon atoms. Similarly, under C8-C10 is to be understood a fatty acid chain comprising 8 to 10 carbon atoms.

The oils used in the present invention can also be termed small to medium-chain triglycerides. They are typically obtained by esterifying glycerol of vegetal origin with mixtures of caprylic and capric acids which are fractionated from coconut and/or palm kernel oils. Typically, no catalysts are used for the esterification step. Refining results in a high stability oil with essentially no odour or flavour. These oils can be easily obtained commercially.

According to an embodiment of the invention, the oil is present in an amount of 0.1-1%, preferably 0.2-0.5% by weight, of the total amount of powder.

Furthermore, the oil may be present in an amount of 0.5-1.5%, preferably 0.8-1.1% by weight of the total amount of sugar. It may further constitute 2-8%, preferably 3-7%, more preferably about 4% by weight of the total fat solids present in the powder.

The powder of the invention may further comprise any of dairy or non-dairy creamers, lecithin, sweeteners, aroma, soluble coffee, soluble tea, soluble fruit powder, soluble chocolate powder, aroma, citric acid etc. or any combinations thereof. Preferably the creamer used is a dairy creamer which comprises skimmed milk, maltodextrins, vegetal oil, buffer salts. Such creamers are readily available commercially. A foam booster may also be present in the powder of the invention although this is not necessary.

According to the invention, the milk-based drink powder of the invention may be an ice coffee powder, ice cappuccino powder, ice tea powder, ice chocolate powder, cafe frappépowder, milk shake powder, fruit drink powder etc.

The resulting instant drink has a typical creamy, milky mouthfeel and comprises a white foam.

The powders of the invention present the advantage that cold water solubility is improved.

By cold water is meant water at room temperature as well as chilled water, i.e. water having a temperature between 4° to 30° C.

Solubility of instant powders depends on different dissolution steps in water, namely wettability, sinkability and dispersibility. Wettability is a measure of the ability of a powder to be wetted with water at a given temperature. This analytical method is commonly used when producing instant powders. Wettability depends on the surface of the agglomerates or single particles. For instance, the surface of the agglomerates or single particles could be water repellent or could absorb water too quickly such as to form a film through which the water can not penetrate.

The standard conditions used for the solubility test is to contact 15 to 25 g of powder to 150 mL of water at 20° C. Under these conditions, the powders of the invention are at least 90% soluble, preferably at least 95% soluble, more preferably at least 99% soluble.

Additionally, the mechanical resistance of the powders is improved. Furthermore, a significant reduction in the powder density is also obtained. The powder thus lends itself to applications where it is submitted to a certain grinding, for example when filled into capsules. Furthermore, when filling powders into capsules, the dosing-filling device increases the density of the powder. This problem is thus avoided when using the powders of the present invention.

Without wishing to be bound by theory, it is assumed that the fines (small particles) of milk-based powders are partly the cause of bad solubility. Furthermore, when used in capsules, they can block the capsules during delivery. The oil thus acts to reduce the formation of fines by agglomeration of the fines and thus reduces the density.

According to a further embodiment of the present invention, the use of food-grade oil to improve the cold water solubility of milk-based powder comprising particulate sugar is also provided. Preferably, the food-grade oil is such as that described above with respect to the powders of the invention.

Preferably, the oil is present as a coating of at least part of the sugar particles. The sugar particles thus act as carrier for the oil at the same time as providing body, solubility and sweet taste to the powders of the invention.

Typically, the oil is present in an amount of 0.1-1%, preferably 0.2-0.5% by weight, of the total amount of powder. Furthermore, the oil may be present in an amount of 0.5-1.5%, preferably 0.8-1.1% by weight of the total amount of sugar. It may further constitute 2-8%, preferably 3-7%, more preferably about 4% by weight of the total fat solids present in the powder.

Moreover, the oil may be used in combination with lecithin.

A method for producing a milk-based instant drink powder comprising particulate sugar, according to the invention, comprises the first step of coating at least part of the sugar particles with a food-grade oil to form a premix.

The oil used is described above with respect to the powders of the invention. In an embodiment, the oil coats the whole amount of sugar present in the instant drink powder.

Preferably, the oil is present in an amount of 0.5-1.5%, preferably 0.8-1.1% by weight of the total amount of sugar. The mixing may be carried out in standard equipment known to the skilled person.

In a second step the premix, comprising at least part or the whole of the sugar coated with oil, is incorporated to further powder ingredients to form the final instant drink powder.

Further powder ingredients may include any of dairy or non-dairy creamers, lecithin, sweeteners, sugar, soluble coffee, soluble tea, soluble fruit drink, soluble chocolate powder, aroma, citric acid or any combinations thereof.

The final instant drink powder preferably comprises 0.1-1%, preferably 0.2-0.5% by weight of oil.

It is advantageous, according to the present invention, to provide a kit for the preparation of a milk-based instant drink comprising at least two capsules wherein a first capsule comprises milk powder, a creamer component and sugar, and wherein a second capsule comprises milk powder, a main flavour component, and sugar.

Both capsules comprise a part of the milk powder and a part of the sugar. In this was, the sugar provides an effect on the milk powder in both capsules. The sugar is typically a crystalline sugar. Furthermore, the creamer component is kept separate from the main flavour component.

A first capsule thus comprises a dairy or non-dairy creamer, preferably a dairy creamer. Typical dairy creamers comprise skimmed milk, maltodextrins, vegetal oil and buffer salts. Such creamers are commercially available. The creamer enables to obtain a creamy taste.

The second capsule, on the other hand, contains the main flavour component which can be selected from soluble coffee, soluble tea, soluble fruit drink, soluble chocolate powder etc. or any mixtures thereof.

The second capsule may further comprise additional flavours, aroma etc. such as vanilla flavour, milk cream flavour, citric acid etc.

In a preferred embodiment, at least part of the sugar particles of the first and/or second capsule are coated with a food-grade oil. The food-grade oil preferably comprises saturated triglycerides. Most preferably, the triglycerides comprise C4-C12, preferably C8-C10 saturated fatty acid chains.

The advantage presented by such a kit is that the solubility of the powders is improved. It has been observed that when all ingredients are present in one capsule, this may give rise to flocculation issues of the milk with the coffee, for example. When using two capsules both containing part of the sugar and part of the milk powder, the solubility is surprisingly increased. Also, a drink with sufficient "dairy taste" can be obtained. Furthermore, when the sugar particles are further coated with a food-grade oil, according to a preferred embodiment, it has been observed that the solubility of the powders is even further improved.

Under another aspect of the invention is provided a method for the production of an instant milk-based drink, comprising the first step of injecting a volume of cold water in at least one capsule comprising milk powder and sugar, wherein at least part of the sugar particles are coated with a food-grade oil. The food-grade oil is such as described above in relation to the powders of the invention.

Water injection is typically done under pressure without any mechanical stirrer or other device. The injection of the water creates mixing of water with the ingredients.

In a second step, the instant drink may be delivered, said instant drink being the result of the interaction of water with the contents of the capsule. The interaction results in dissolution of the contents of the capsule in the water.

The method is typically carried out using a beverage capsule machine. These are known in the art.

The result is that a cold beverage can be obtained with a high percentage of solubilised ingredients in a matter of a few seconds.

The kit of the invention comprising at least two capsules as described above may be used in a method according to the invention whereby at least said two capsules are sequentially injected with cold water to produce a cold instant beverage.

The kit of the invention is further defined according to claims

Thus, the capsules may be served in sequence in a beverage capsule machine for example. The capsule comprising the creamer is generally first injected followed by the capsule comprising the main flavour component. The result is a beverage, preferably cold, in two separate phases or slightly mixed phases. The white phase (creamer phase) is on top of the coffee phase, when coffee is used as the main flavour component for example.

Using the method of the invention, the instant milk-based drinks obtained may be an ice coffee, ice cappuccino, ice tea, ice chocolate, cafe frappé, milk shake or fruit drink. These have a creamy, milky mouthfeel, have a foamy aspect and excellent organoleptic properties.

The present invention is further illustrated hereinafter with the following non-limiting examples.

EXAMPLES

Example 1

Recipe for "light" ice cappuccino all in one capsule

| Ingredients | Quantity (grams) |
|---|---|
| Instant coffee | 1.0-2.0 |
| Sugar | 3.0-4.0 |
| Whole milk powder | 7.0-9.0 |
| Sugar replacer (e.g. aspartame) | 0.01-0.05 |
| Flavours | 0.05-0.15 |
| Foam booster | 0-1.0.5 |

The inventors have found that a soluble powder could also be obtained in one capsule when using the above recipe. Such product is less creamy and the presence of a foam booster is generally needed.

Example 2

Recipe for ice cappuccino in two capsules—high milk solids version

| Ingredients | Capsule 1 "creamer" | Capsule 2 "coffee mix" |
|---|---|---|
| Sugar | 4.5-5.0 | 5.5-6.5 |
| Whole milk powder | 1.0-2.0 | 6.0-7.0 |
| Milk-based creamer | 6.0-7.0 | |
| Instant coffee | | 1.0-2.0 |
| Flavour | | 0.1-0.2 |

Example 3

Comparison between standard coffee and creamer mixes and coffee and creamer mixes with MCT (medium-chain triglyceride) oil.

| | Coffee Mix | | Creamer Mix | |
|---|---|---|---|---|
| | Standard | +MCT | Standard | +MCT |
| Powder density | 615 | 602 | 614 | 586 |
| Tapped density 500 ml (g/litre) | | 600 | | 590 |
| Miscibility in water @ 20° C. | | 72 sec. | | 14 sec. |
| Time for a given amount of powder to sink in water | >360 sec. (14 g) | 85 sec. (14 g) | >900 sec. (25 g) | 25 sec. (25 g) |

Example 4

Product formula for creamer capsule

| Ingredient | w/w dry basis | Capsule composition |
|---|---|---|
| PREMIX | | |
| Sucrose | 9.5-10.5% | 1.0-1.5 g |
| MCT oil | 0.1-0.5% | 0.01-0.1 g |
| MIX | | |
| Premix | 9.6-11% | 1.0-1.6 g |
| Sucrose | 25-30% | 3.0-4.0 g |
| Milk powder | 10-15% | 1.0-2.0 g |
| creamer | 45-55% | 6.0-7.0 g |

Product formula for coffee capsule

| Ingredient | w/w dry basis | Capsule composition |
|---|---|---|
| PREMIX | | |
| Sucrose | 9.5-10.5% | 1.0-1.5 g |
| MCT oil | 0.1-0.5% | 0.01-0.1 g |
| Flavour | 0.8-1.3% | 0.1-0.2 g |
| MIX | | |
| Premix | 10.4-12.3% | 1.1-1.8 g |
| Sucrose | 28-33% | 4.0-5.0 g |
| Milk powder | 45-48% | 6.0-7.0 g |
| coffee | 10-11% | 1.0-2.0 g |

Example 5

Total product formulation for two capsules:

| Ingredient | w/w dry basis |
|---|---|
| Sucrose | 35-45% |
| Milk powder | 25-35% |
| Creamer | 20-25% |
| Coffee | 3-7% |
| Flavour | 0.1-1% |
| MCT oil | 0.1-0.5% |

The above product formulation could be used to prepare an ice cappuccino instant drink from two capsules ("creamer" capsule and "coffee" capsule).

Example 6

Comparative example with and without MCT oil.
Iced Cappuccino

| | Creamer | Coffee | Creamer MCT | Coffee MCT |
|---|---|---|---|---|
| COFFEE | | 1-2 | | 1-2 |
| SUCRE | 4-5.5 | 5-7 | 4-5.5 | 5-7 |
| Milk Powder | 1-2 | 6-7 | 1-2 | 6-7 |
| Creamer | 6-7 | | 6-7 | |
| Flavour | | 0.1-0.2 | | 0.1-0.2 |
| MCT Oil - | | | 0.01-0.1 | 0.01-0.1 |
| Total | 11-14.5 | 12.1-16.2 | 11.01-14.6 | 12.11-16.3 |

Powder Characteristics after Mixing

| Tapped dens. @ start (g/l) | 600 | 600 | (588) 577 | (601) 594 |
|---|---|---|---|---|
| Solubility % | 97 | | | |

Powder Characteristics after Crushing (Filling Process Simulation)

| Tapped density (g/l) | 640 | 625 | | |
|---|---|---|---|---|
| Solubility % | 94 | 97 | 100 | 99 |

The results show the effect on density and on solubility of the presence of MCT oil.

The solubility is evaluated visually after the capsules have been processed in a Nestlé® Dolce Gusto™ branded beverage machine.

The invention claimed is:

1. Kit for the preparation of a foamy drink made from cold water and ingredients that include milk powder, the kit comprising at least two capsules capable of sequential injection with the cold water by an extraction device to produce the drink, the sequential injection comprising injection of the first capsule with a portion of the cold water and then injecting the second capsule with another portion of the cold water, the kit comprising:
   a first capsule comprises milk powder, a dairy creamer and sugar, the ratio of the milk powder to the dairy creamer in the first capsule between 1:6 and 1:2; and
   a second capsule comprises milk powder, sugar and a flavour component selected from the group consisting of soluble coffee, soluble chocolate powder, and mixtures thereof.

2. Kit according to claim 1, wherein the ratio of milk powder in the first and second capsules is between 1:10 to 1:2.

3. Kit according to claim 1, wherein at least part of the sugar of the first and/or second capsule is coated with a food-grade oil comprising C8-C10 saturated triglycerides.

4. Kit according to claim 1, wherein the first capsule comprises:
   between 10 and 25% sugar,
   between 5 and 15% milk powder, and
   between 10 and 60% dairy creamer.

5. Kit according to claim 4, wherein the second capsule comprises:
   between 10 and 40% sugar,
   between 20 and 50% milk powder, and
   between 5 to 20% flavor component.

6. Kit according to 4, wherein the dairy creamer contains skimmed milk, maltodextrins, vegetal oil, and buffer salts.

7. Kit according to claim 1, wherein the second capsule comprises additional flavours, and aroma.

8. Kit according to claim 1, wherein a food-grade oil is present in at least one of the first capsule and the second capsule in an amount of 0.8 to 1.1% by weight of the amount of sugar, and at least part of the sugar particles of the at least one of the first and second capsules in which the food-grade oil is present are coated with at least a portion of the food-grade oil.

9. Kit according to claim 8, wherein the food-grade oil comprises saturated triglycerides.

10. Kit according to claim 1, wherein the ratio of the milk powder to the creamer component in the first capsule is between 1:6 and 1:3.

* * * * *